United States Patent
Izvekova et al.

(10) Patent No.: US 11,677,742 B2
(45) Date of Patent: Jun. 13, 2023

(54) SYSTEMS AND METHODS FOR CREATING MULTI-APPLICANT ACCOUNT

(71) Applicant: The Toronto-Dominion Bank, Toronto (CA)

(72) Inventors: Marina Izvekova, Toronto (CA); Jane Holtslander, Toronto (CA); Andrew David Clark, Whitby (CA); Alan Tam, Markham (CA); Tina Patel, Brampton (CA); Steven Anthony Ghose, Burlington (CA); Michael David Mewhort, Brantford (CA); Chun Yu Zhang, Toronto (CA)

(73) Assignee: THE TORONTO-DOMINION BANK, Toronto (CA)

(*) Notice: Subject to any disclaimer, the term of this patent is extended or adjusted under 35 U.S.C. 154(b) by 288 days.

(21) Appl. No.: 16/570,281

(22) Filed: Sep. 13, 2019

(65) Prior Publication Data

US 2021/0084028 A1 Mar. 18, 2021

(51) Int. Cl.
| | |
|---|---|
| *H04L 9/40* | (2022.01) |
| *H04L 67/306* | (2022.01) |
| *H04L 67/01* | (2022.01) |
| *H04W 4/14* | (2009.01) |
| *H04L 51/42* | (2022.01) |
| *H04L 51/52* | (2022.01) |

(52) U.S. Cl.
CPC .......... *H04L 63/0838* (2013.01); *H04L 67/01* (2022.05); *H04L 67/306* (2013.01); *H04L 51/42* (2022.05); *H04L 51/52* (2022.05); *H04W 4/14* (2013.01)

(58) Field of Classification Search
CPC ... H04L 63/0838; H04L 67/306; H04L 67/42; H04L 51/22; H04L 51/32; H04W 4/14
USPC .................................................. 726/7
See application file for complete search history.

(56) References Cited

U.S. PATENT DOCUMENTS

| | | | | |
|---|---|---|---|---|
| 9,565,175 | B1* | 2/2017 | Saylor | H04W 4/12 |
| 10,121,301 | B1* | 11/2018 | Ren | G07C 9/00896 |
| 11,062,367 | B1* | 7/2021 | Adiseshan | G06Q 30/0621 |
| 2010/0146500 | A1* | 6/2010 | Joubert | G06F 8/61 |
| | | | | 455/419 |
| 2012/0066749 | A1* | 3/2012 | Taugbol | G06F 21/35 |
| | | | | 726/6 |
| 2015/0095143 | A1* | 4/2015 | Jin | G06Q 30/0251 |
| | | | | 705/14.49 |
| 2015/0288701 | A1* | 10/2015 | Brand | H04L 63/0838 |
| | | | | 726/7 |

(Continued)

*Primary Examiner* — Nicholas R Taylor
*Assistant Examiner* — Chong G Kim
(74) *Attorney, Agent, or Firm* — Ridout & Maybee LLP

(57) ABSTRACT

Methods and systems for creating a multi-applicant account profile are described. During a first remote session, a first applicant provides at least two pieces of contact data for second applicant. A unique link and a one-time password are transmitted to the second applicant using respective first and second pieces of contact data. A second remote session is initiated, in response to receipt of the one-time password, provided via the unique link. During the second remote session, identification information of the second applicant is provided. A new multi-applicant account profile is then created, after verifying the identification information of the first applicant and the second applicant.

20 Claims, 12 Drawing Sheets

(56) References Cited

U.S. PATENT DOCUMENTS

| | | | | |
|---|---|---|---|---|
| 2015/0348032 A1* | 12/2015 | Ioveva | ............... | G06Q 20/2295 |
| | | | | 705/44 |
| 2017/0032351 A1* | 2/2017 | Burroughs, Jr. | ........ | G06Q 20/32 |
| 2017/0053257 A1* | 2/2017 | Vea | ......................... | G06Q 20/22 |
| 2018/0032757 A1* | 2/2018 | Michael | .................. | G16H 10/60 |
| 2018/0218133 A1* | 8/2018 | Hussain | ................ | H04L 63/108 |
| 2019/0026456 A1* | 1/2019 | Hon | ......................... | G06F 21/40 |
| 2019/0146725 A1* | 5/2019 | Kook | .................. | H04W 12/009 |
| | | | | 358/1.14 |

* cited by examiner

610

Application for Joint Account – Step 4 of 5

Joint applicant information

Joint applicant name [_____] ~612

Provide two contacts for the joint applicant:

614a  614b

First contact: [▼____] [_____]

Second contact: [Email / Phone ▼] [_____]
616a  616b

618

(+) Add another joint applicant

619

[Submit]

Application for Joint Account

Personal information

Full legal name: ⸺⸺⸺⸺⸺⸺⸺⸺ 652

Birthdate: ⸺⸺⸺⸺⸺⸺⸺⸺ 654

Home address: ⸺⸺⸺⸺⸺⸺⸺⸺ 656

658

Submit

FIG. 6E

SYSTEMS AND METHODS FOR CREATING MULTI-APPLICANT ACCOUNT

FIELD

The present disclosure is related to systems and methods for creating a multi-applicant account.

BACKGROUND

In order to conduct transactions with a customer, an institution may create an account profile for that customer. The account profile may be linked with a profile of the customer, for example. In some examples, an account profile may be linked with profiles of two or more customers. For example, in the case of a financial institution, a joint account (also referred to as a multi-applicant account) may be created and linked to two or more customer profiles.

Typically, creating a new multi-applicant profile account requires verification of the identification of all applicants. In some examples, such as institutions that require an in-person visit to create a new account profile, this may require all applicants to be physically at the same location at the same time. This requirement may be inconvenient.

Some institutions enable creation of a new account profile by an applicant via an online session. However, this is typically limited to single applicant accounts; or typically requires all applicants of a multi-applicant account to provide identification information during the same online session. Again, this could be inconvenient or difficult to coordinate, especially when there are many applicants. Further, there could be privacy issues in sharing an online session among multiple applicants. For example, each applicant may have access to the identification information of each other applicant.

Accordingly, there is a need for improved methods, devices and systems related to creation of a multi-applicant account profile.

BRIEF DESCRIPTION OF THE DRAWINGS

Reference will now be made, by way of example, to the accompanying drawings which show example embodiments of the present application, and in which:

FIGS. 6A-6E show example user interfaces that may be displayed during the method of FIG. 4;

Similar reference numerals may have been used in different figures to denote similar components.

DESCRIPTION OF EXAMPLE EMBODIMENTS

Figure 1:
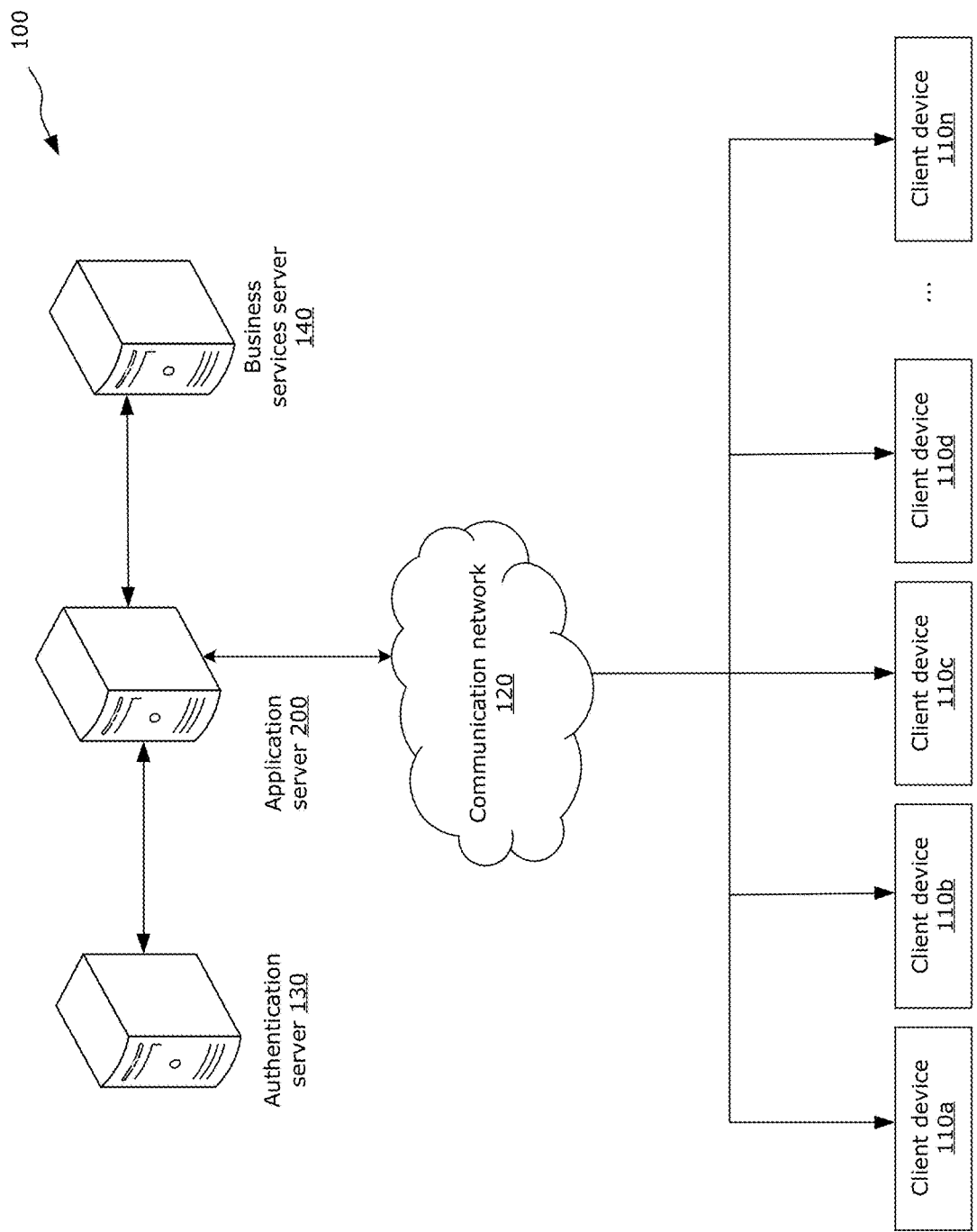
FIG. 1 is a schematic diagram of an example network environment in which example embodiments of the present disclosure may be implemented.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Elements referred to in the singular may be implemented in the plural and vice versa, except where indicated otherwise either explicitly or inherently by context.

In accordance with one aspect of the present disclosure, there is provided a server, which may be an application server. The server includes at least one communication interface for communication with one or more client devices. The server also includes a processor coupled to the communication interface and a memory coupled to the processor. The memory includes computer-executable instructions stored thereon. The instructions, when executed by the processor, cause the server to, during a first remote session, receive, via the communication interface, a signal representing identification information of a first applicant, and a signal representing at least two pieces of contact data for second applicant. The instructions also cause the server to transmit, using a first piece of contact data for the second applicant, via the communication interface, a signal representing a unique link. The instructions also cause the server to transmit, using a second piece of contact data for the second applicant, via the communication interface, a signal representing a one-time password. The instructions also cause the server to initiate a second remote session, in response to receipt, via the communication interface, of a signal representing the one-time password, the one-time password being provided via the unique link. The instructions also cause the server to, during the second remote session, receive, via the communication interface, a signal representing identification information of the second applicant. The instructions also cause the server to create a new multi-applicant account profile, after verifying the identification information of the first applicant and the identification information of the second applicant.

In accordance with another aspect of the present disclosure, there is provided a method at a server, such as an application server. The method includes, during a first remote session, receiving a signal representing identification information of a first applicant, and a signal representing at least two pieces of contact data for second applicant. The method also includes transmitting, using a first piece of contact data for the second applicant a signal representing a unique link. The method also includes transmitting, using a second piece of contact data for the second applicant, via the communication interface, a signal representing a one-time password. The method also includes initiating a second remote session, in response to receipt of a signal representing the one-time password, the one-time password being provided via the unique link. The method also includes, during the second remote session, receiving a signal representing identification information of the second applicant. The method also includes creating a new multi-applicant account profile, after verifying the identification information of the first applicant and the identification information of the second applicant.

In accordance with another aspect of the present disclosure, there is provided a non-transitory machine-readable medium having tangibly stored thereon executable instructions for execution by a processor of a server, such as an application server. The instructions, when executed by the processor, cause the server to, during a first remote session, receive, via the communication interface, a signal representing identification information of a first applicant, and a signal representing at least two pieces of contact data for second applicant. The instructions also cause the server to transmit, using a first piece of contact data for the second applicant, via the communication interface, a signal representing a unique link. The instructions also cause the server to transmit, using a second piece of contact data for the second applicant, via the communication interface, a signal representing a one-time password. The instructions also cause the server to initiate a second remote session, in response to receipt, via the communication interface, of a signal representing the one-time password, the one-time password being provided via the unique link. The instructions also cause the server to, during the second remote session, receive, via the communication interface, a signal representing identification information of the second applicant. The instructions also cause the server to create a new multi-applicant account profile, after verifying the identification information of the first applicant and the identification information of the second applicant.

In any of the above, the server may further: during the first remote session, receive, via the communication interface, a signal representing at least two pieces of contact data for a third applicant; transmit, using a first piece of contact data for the third applicant, via the communication interface, a signal representing another unique link; transmit, using a second piece of contact data for the third applicant, via the communication interface, a signal representing another one-time password; initiate a third remote session, in response to receipt, via the communication interface, of a signal representing the other one-time password, the other one-time password being provided via the other unique link; and during the third remote session, receive, via the communication interface, a signal representing identification information of the third applicant. The new multi-applicant account profile may be created after verifying the identification information of the first applicant, the identification information of the second applicant, and the identification information of the third applicant.

In any of the above, the second remote session and the third remote session may be conducted in parallel, or in any temporal order.

In any of the above, the server may further: during the second remote session, receive, via the communication interface, a signal representing at least two pieces of contact data for a third applicant; transmit, using a first piece of contact data for the third applicant, via the communication interface, a signal representing another unique link; transmit, using a second piece of contact data for the third applicant, via the communication interface, a signal representing another one-time password; initiate a third remote session, in response to receipt, via the communication interface, of a signal representing the other one-time password, the other one-time password being provided via the other unique link; and during the third remote session, receive, via the communication interface, a signal representing identification information of the third applicant. The new multi-applicant account profile may be created after verifying the identification information of the first applicant, the identification information of the second applicant, and the identification information of the third applicant.

In any of the above, the server may further: transmit, via the communication interface, signals representing a notification to the first applicant indicating addition of the third applicant. The new multi-applicant account profile may be created after receiving, via the communication interface, signals representing confirmation of the third applicant by the first applicant.

In any of the above, the at least two pieces of contact data for the second applicant may include at least two of: an email address; a phone number; or a social media account.

In any of the above, the signal representing the unique link may be transmitted using one of: an email message to the email address; a text message to the phone number; or a private message to the social media account. Further, the signal representing the one-time password may be transmitted using a different one of: an email message to the email address; a text message to the phone number; or a private message to the social media account.

In any of the above, the server may receive the identification information from one of the first applicant or the second applicant by: verifying that the one of the first applicant or the second applicant is an existing customer; and retrieving the identification information of the one of the first applicant or the second applicant from a customer database.

In any of the above, the server may further: after creating the multi-applicant account, transmit, via the communication interface, signals representing a respective notification to each applicant to indicate the multi-applicant account was successfully created.

In any of the above, the identification information of the second applicant may be inaccessible to the first applicant, and the identification information of the first applicant may be inaccessible to the second applicant.

FIG. 1 shows an example network 100 which may be used to implement examples described herein. In this example, a plurality of client devices 110a-110n (generally referred to as client device(s) 110) may be connected, through a communication network 120, to an application server 200 via any suitable communications links, such as network links, wireless links, hard-wired links, and the like. The client devices 110a-110n may be the same or different from each other. For example, each client device 110 may be an instance of the example client device 110 illustrated in FIG. 3 and described further below.

Examples of the client device 110 include, but are not limited to, handheld or mobile wireless communication devices, such as personal digital assistants (PDAs), smartphones, tablets, laptop or notebook computers, netbook or ultrabook computers; as well as vehicles having an embedded-wireless communication system, such as a Wi-Fi or cellular equipped in-dash infotainment system, or tethered to another wireless communication device having such capabilities. Examples of the client device 110 may also include sensors or other wirelessly connected devices, such as internet of things (IoT) devices or smart speakers, among other possibilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), code-division multiple access (CDMA), Enhanced Data GSM Environment (EDGE), Universal Mobile Telecommunications System (UMTS), Evolution-Data Optimized (EvDO), High Speed Packet Access (HSPA), 3rd Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The communication network 120 may include any one or more suitable computer networks including, for example, the Internet, an intranet, a wide-area network (WAN), a wireless WAN (WWAN), a local-area network (LAN), a wireless LAN (WLAN), a wireless network, a digital subscriber line (DSL) network, a frame relay network, an asynchronous transfer mode network, a virtual private network (VPN), a public-switched telephone network (PSTN), or a public-land mobile network (PLMN), or any combination of any of the same. Network communications may be facilitated through the use of any suitable communication such as transmission control protocol/internet protocol (TCP/IP), Ethernet, file transfer protocol (FTP), hypertext transfer protocol (HTTP), HTTP secure (HTTPS), and the like.

The application server 200 is operable to communicate signals and exchange data with each client device 110, via the communication network 120. The application server 200 in this example network 100 is also coupled to an authentication server 130 that is operable to provide authentication services, and a business services server 140 that is operable to provide account management services. The application server 200, authentication server 130 and business services server 140 may all be operated by a common operator, such as a financial institution. It is to be appreciated that although one instance each of the application server 200, authentication server 130 and business services server 140 are shown, there may be more than one instance of each server 200, 130, 140. Further, the functions of the application server 200, authentication server 130 and business services server 140 may be performed using greater or fewer numbers of servers. For example, the application server 200, authentication server 130 and business services server 140 may be replaced by a single server that provides all the functions of the application server 200, authentication server 130 and business services server 140. It should be understood that although a single communication network 120 is shown, there may be multiple instances of the communication network 120, and the components of the network 100 may communicate with each other via different communication networks 120.

The above-described communication network 100 is provided for the purpose of illustration only. The above-described communication network 100 includes one possible network configuration of a multitude of possible configurations. Suitable variations of the communication network 100 will be understood to a person of skill in the art and are intended to fall within the scope of the present disclosure. In some embodiments, the network includes multiple components distributed among a plurality of computing devices. One or more components may be in the form of machine-executable instructions embodied in a machine-readable medium.

Figure 2:
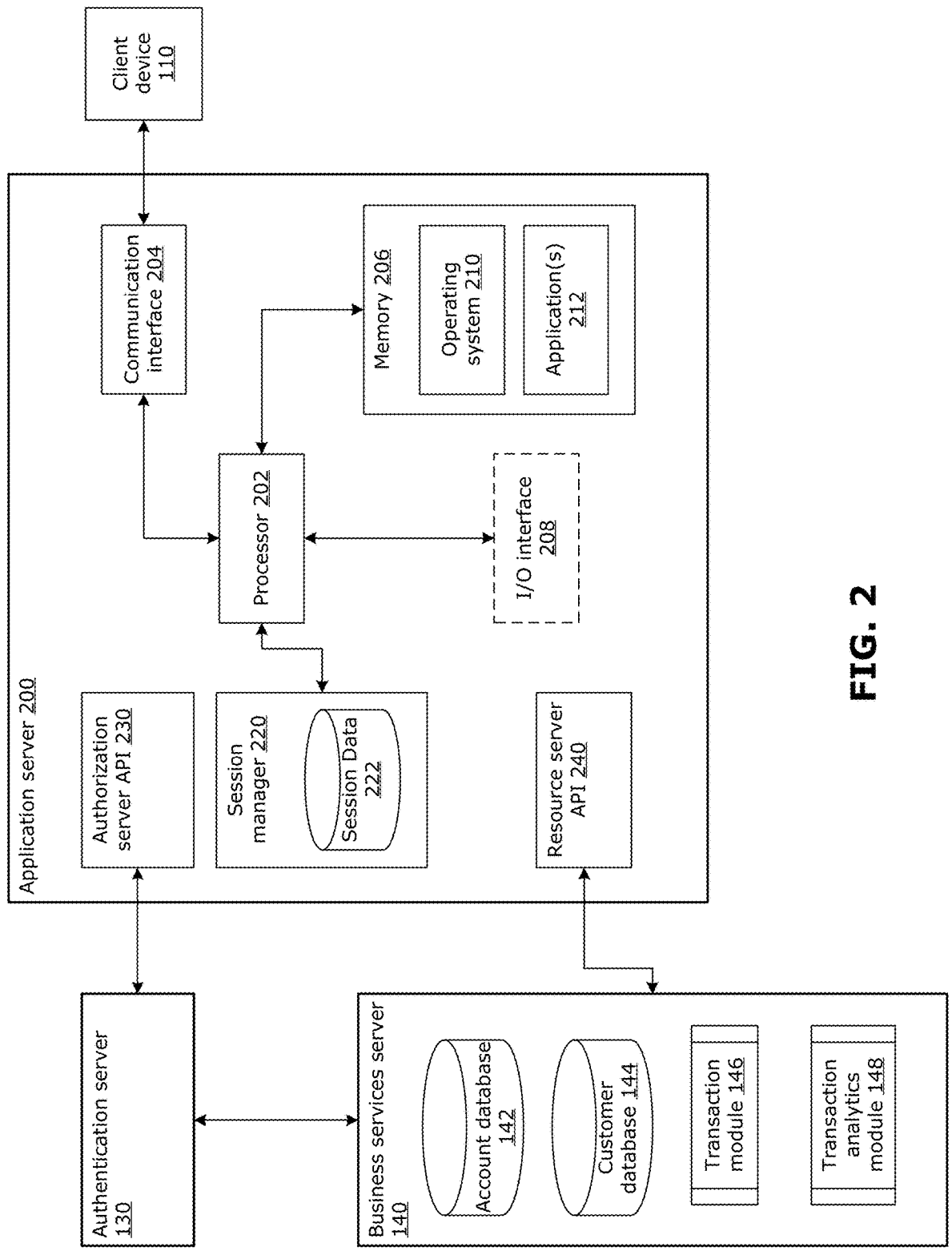
FIG. 2 is a block diagram of a web application server in accordance with example embodiments of the present disclosure.

Reference is next made to FIG. 2 which illustrates in simplified block diagram form details of the application server 200, authentication server 130 and business services server 140, in accordance with example embodiments of the present disclosure.

The application server 200 includes a controller comprising at least one processor 202 (such as a microprocessor) which controls the overall operation of the application server 200. The processor 202 is coupled to a plurality of components via a communication bus (not shown) which provides a communication path between the components and the processor 202. The processor 202 is coupled to a communication interface 204 that communicates directly or indirectly with a corresponding communication interface (not shown) of a client device 110, and possibly communicates with other computing devices by sending and receiving corresponding signals. The communication interface 204 may communicate via one or a combination of Bluetooth® or other short-range wireless communication protocol, Wi-Fi™, and a cellular, among other possibilities. The processor 202 is also coupled to one or more memories 206, which may include one or more of RAM, ROM and/or persistent (non-volatile) memory such as flash memory.

The application server 200 may include an optional input/output (I/O) interface 208 for interfacing with optional input devices and/or output devices (not shown), such as a keyboard, mouse, touchscreen, display and/or speaker. The application server 200 may also include various data I/O ports (not shown) such as serial data port (e.g., USB data port). Operating system software 210 executed by the processor 202 is stored in the memory(ies) 206, typically the persistent memory but may be stored in other types of memory devices, such as ROM or similar storage element. Software application(s) 212 executed by the processor 202 may also be stored in the memory(ies) 206. System software, software modules, specific device applications, or parts thereof, may be temporarily loaded into a volatile memory, such as RAM, which is used for storing runtime data variables and other types of data or information. Communication signals received by the application server 200 may also be stored in RAM. Although specific functions are described for various types of memory, this is merely one example, and a different assignment of functions to types of memory may be used in other embodiments.

The processor 202 is coupled to a session manager 220. Although FIG. 2 shows the session manager 220 separate from the memory 206, in some examples the session manager 220 may be implemented using software instructions stored in the memory 206.

The session manager 220 manages sessions between the application server 200 and one or more client devices 110. In the present disclosure, a session involves communications (and typically exchange of data) between the application server 200 and a client device 110. Because the user of the client device 110 is able to interact with the application server 200 of an institution, instead of being physically present at a physical location of the institution, such a session may be referred to as a remote session (e.g., in contrast with an in-person session). A form of remote session is an online session, in which a web-based portal may provide access to the application server 200, and in which data may be exchanged via the internet or similar communication network. Other forms of remote sessions may include, for example, a session conducted via text messages (e.g., using a chatbot or other natural language processing system), or via telephone (e.g., using an interactive voice response system), among other possibilities. For simplicity, unless explicitly indicated otherwise, references to a session in the present disclosure should be understood to mean a remote session.

A session may be established between a single client device 110 and the application server 200, such that the session is specific to that client device 110. The application server 200 may be involved in multiple sessions with multiple different client devices 110 simultaneously. In some examples, a single client device 110 may be involved in multiple different sessions with the application server 200, such as via respective different applications. The application server 200 may perform a task or a function (e.g., creating a new customer profile, or creating a new account profile) that may require two or more sessions (with a single or multiple client devices 110) to complete.

The session manager 220 may store session data 222. Session data 222 may include state information about a current state of an ongoing session, and may also include information about session history. For example, session data 222 may include information that enable two or more sessions to be associated with each other, which may be the case if two or more sessions are required to complete a task or function.

The application server 200 includes an authorization server application programming interface (API) 230 and a resource server API 240. The resource server API 240 is an API that allows the application server 200 to communicate securely with a resource server such as the business services server 140. The business services server 140 may store data, including private data, which may be exchanged with the client device 110. In some examples, the business services server 140 may be operated by a financial institution such as a bank, and may include an account database 142 that includes private data in the form of banking data. Data stored in the account database 142 may include account profiles and information associated with account profiles. The business services server may also include a customer database 144 that includes customer profiles containing customer data. Customer profiles in the customer database 144 may be linked to one or more account profiles in the account database 142, and vice versa. Account profiles and customer profiles may also be stored by the business services server 140. In the present disclosure, a customer may be a user of the client device 110 who has a customer profile and/or who is associated with an account profile.

The business services server 140 may also include various functional modules for performing operations, such as data queries/searches and data transfers (e.g., transactions) based upon the banking data including, for example, a transaction module 146 for performing data transfers/transactions and a transaction analytics module 148 for performing queries/searches and analytics based on the banking data.

In some examples, authentication of a client device 110 and/or a user may be required before data exchange with the application server 200 is allowed. In some examples, authentication or verification of identification data may be required before a customer profile is created for that user (e.g., in the case where the user is not an existing customer of the institution), or an account profile is created and/or linked to that user (e.g., in the case where a customer profile has already been created for the user). The specifics of the authorization and authentication process are outside the scope of the present disclosure. The authorization server API 230 is an API that allows the application server 200 to communicate securely with the authentication server 130 to perform the required authentication or verification. The authentication server 130 may be operated by a third-party, and may further communicate with another database and/or server (not shown) to perform the required authentication or verification.

Figure 3:
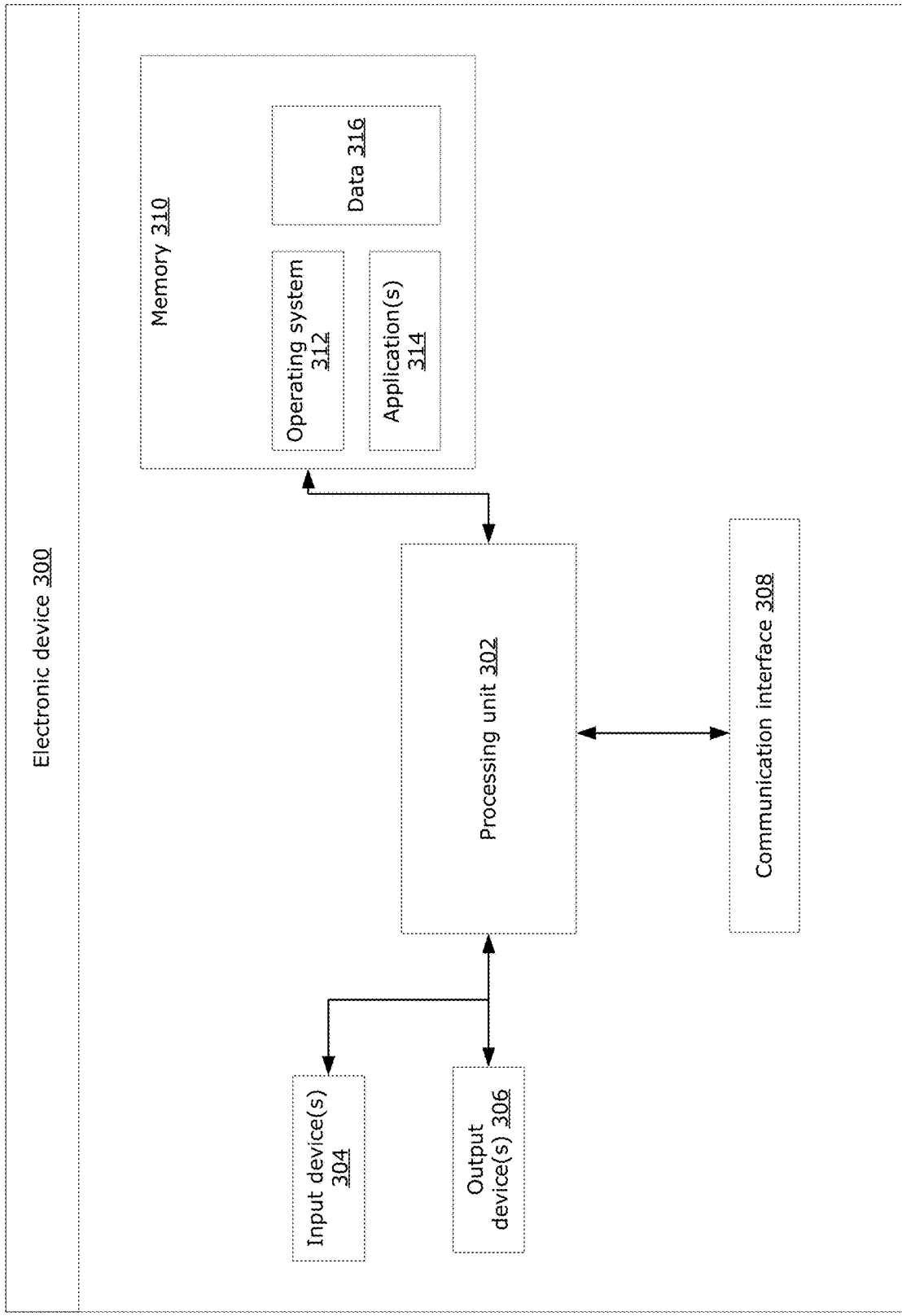
FIG. 3 is a block diagram of an example client device that may be used with example embodiments of the present disclosure.

Reference is now made to FIG. 3, which is a simplified block diagram of an example electronic device 300. The electronic device 300 may be an example of a client device 110 that may communicate with the application server 200 as disclosed herein. The electronic device 300 in this example includes at least one processing unit 302 (such as a microprocessor) which controls the overall operation of the electronic device 300. The processing unit 302 is coupled to a plurality of components via a communication bus (not shown) which provides a communication path between the components and the processing unit 302.

The electronic device 300 includes one or more output devices 304 coupled to the processor 302. The one or more output devices 304 may include, for example, a speaker and a display (e.g., a touchscreen). Generally, the output device(s) 304 of the electronic device 300 may capable of providing visual output and/or other types of output (e.g., audio, tactile or haptic output). The electronic device 300 may also include one or more additional input devices 306 coupled to the processor 302. The one or more input devices 306 may include, for example, buttons, switches, dials, a keyboard or keypad, or navigation tool, depending on the type of electronic device 300. In some examples, an output device 304 (e.g., a touchscreen) may also serve as an input device 306. A visual interface, such as a GUI, may be rendered and displayed on the touchscreen by the processor 302. A user may interact with the GUI using the touchscreen and optionally other input devices (e.g., buttons, dials) to display relevant information, such as banking or other financial information, etc. The electronic device 300 may also include a data port (not shown) such as a serial data port (e.g., USB data port).

The electronic device 300 may also include one or more sensors (not shown) coupled to the processor 302. The sensors may include a biometric sensor, a motion sensor, a camera, an IR sensor, a proximity sensor, a data usage analyser, and possibly other sensors such as a satellite receiver for receiving satellite signals from a satellite network, orientation sensor, electronic compass or altimeter.

The processor 302 is coupled to a communication interface 308, which may include one or more transmitter(s), receiver(s) and/or transceiver(s) for exchanging radio frequency signals with a wireless network that is part of the communication network. For example, the communication interface 308 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network).

In some examples, the electronic device 300 may also include a satellite receiver (not shown) for receiving satellite signals from a satellite network that comprises a plurality of satellites which are part of a global or regional satellite navigation system.

The processor 302 is also coupled to one or more memories 310, such as RAM, ROM or persistent (non-volatile) memory such as flash memory. The memory(ies) 310 may store operating system software 312 executable by the processor 302. One or more applications 314 executable by the processor 302 may also be stored in the memory(ies) 310. For example, the memory(ies) 310 may store instructions for implementing a visual interface (e.g., a GUI). The memory(ies) 310 also may store a variety of data 316. The data 316 may include user data including user preferences, settings and possibly biometric data about the user for authentication and/or identification; a download cache including data downloaded via the communication interface 308; and saved files.

System software, software modules, specific device applications, or parts thereof, may be temporarily loaded into a volatile store, such as RAM, which is used for storing runtime data variables and other types of data or information. Communication signals received by the electronic device 300 may also be stored in RAM. Although specific functions are described for various types of memory, this is merely one example, and a different assignment of functions to types of memory may be used in other embodiments.

The electronic device 300 may also include a power source (not shown), for example a battery such as one or more rechargeable batteries that may be charged, for example, through charging circuitry coupled to a battery interface such as a serial data port. The power source provides electrical power to at least some of the components of the electronic device 300, and a battery interface may provide a mechanical and/or electrical connection for the battery.

One or more functions/modules described as being provided at the electronic device 300 may be implemented or provided by the application server 200. For example, instructions for implementing a GUI may not be stored in the electronic device 300. Instead, the application server 200 may store instructions for implementing a GUI.

Figure 4:
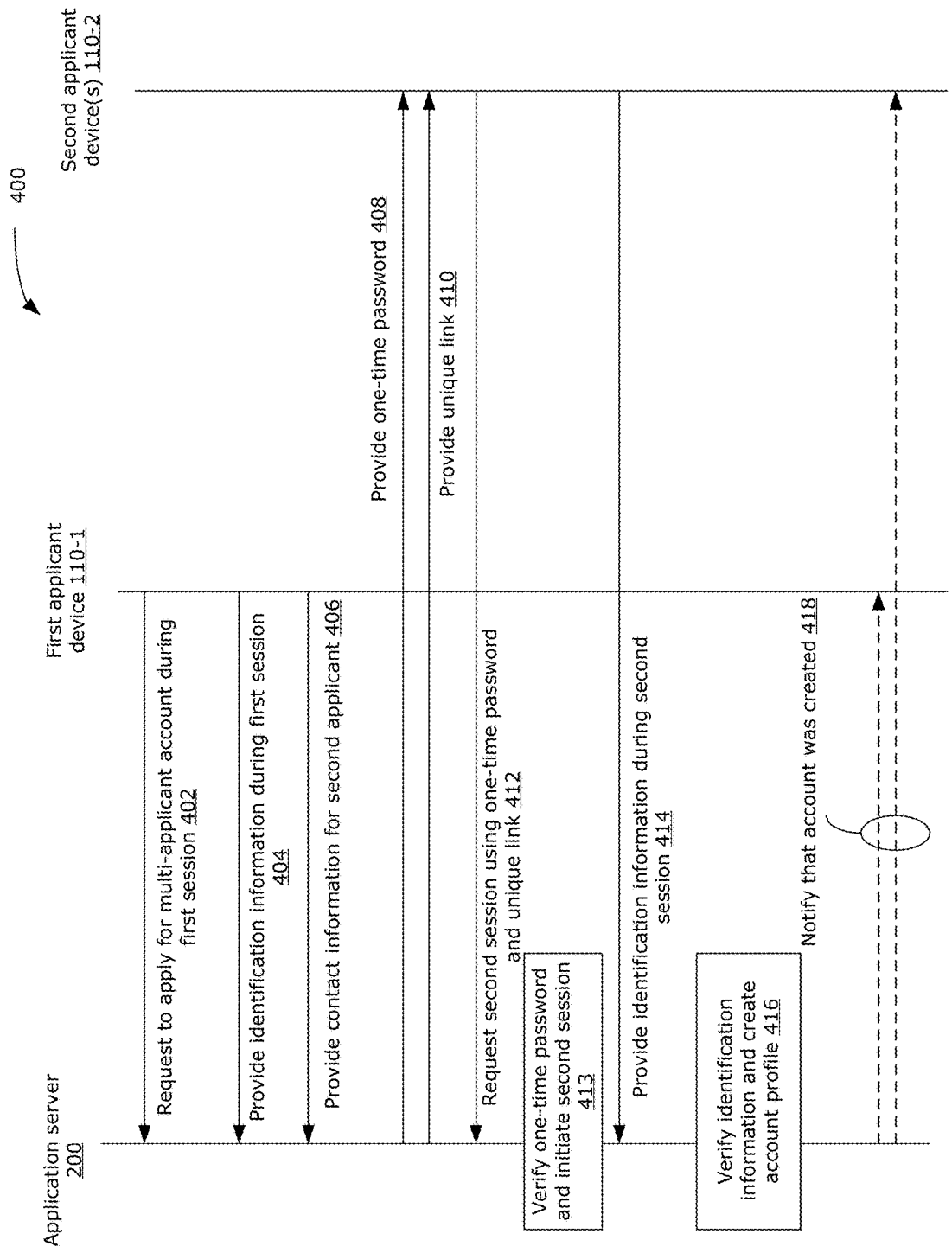
FIG. 4 is a signaling diagram illustrating an example method for creating a multi-applicant account profile.
Figure 5:
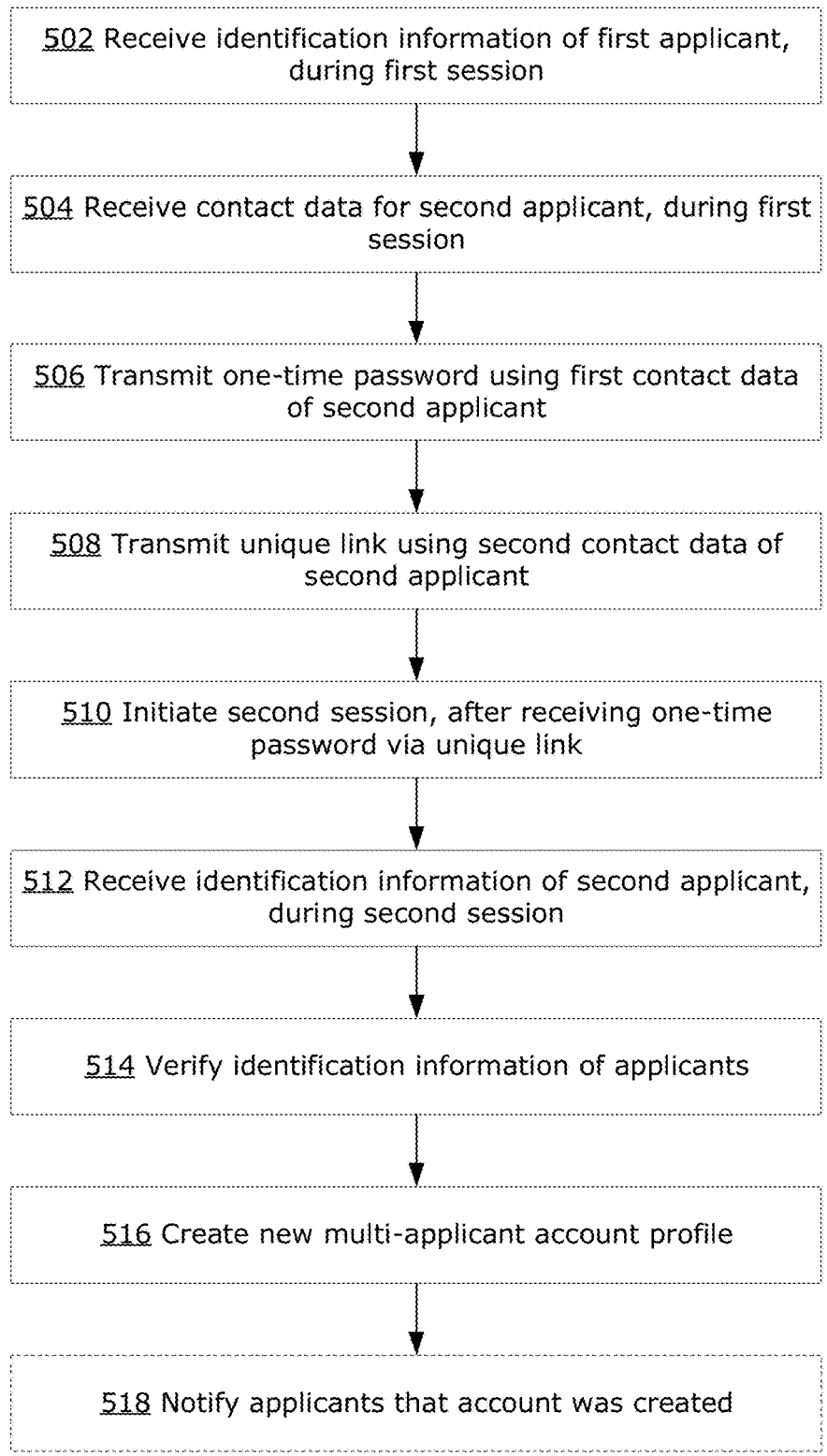
FIG. 5 is a flowchart illustrating an example method performed by the application server, as part of the method of FIG. 4.

FIGS. 4 and 5 are now described together. FIG. 4 illustrates an example signaling diagram of an example method 400 for creating a new multi-applicant account profile. FIG. 5 is a flowchart illustrating a method 500, which may be performed by the application server 200 as part of the method 400. Although FIG. 4 shows signals being transmitted directly between the entities illustrated, it should be understood that there may be one or more intermediate nodes (e.g., intermediate access points and/or relay nodes) not shown for simplicity. Further, although FIG. 4 and FIG. 5 illustrate an order to the signals and steps of the method 400, it should be understood that this is only for the purpose of illustration; the method 400 may be performed in an order different from that specifically shown.

The method 400 may involve the application server 200, a first applicant device 110-1 (e.g., a client device 110 that is used by a first applicant to communicate with the application server 200), and one or more second applicant devices 110-2 (e.g., one or more client devices 110 that are used by a second applicant to communicate with the application server 200). Implementation of the method 400 may include a sequence of interfaces, also referred to as user interfaces or graphical user interfaces (GUIs), which may be displayed at the first and/or second applicant device(s) 110-1, 110-2. Any such GUIs may be displayed at the applicant device(s) 110-1, 110-2 based on signals from the application server 200.

The first applicant device 110-1 transmits a signal 402 to the application server 200 requesting to apply for a new multi-applicant account. The request is made during a first session conducted between the first applicant device 110-1 and the application server. It should be noted that other interactions and tasks may be performed during the first session.

As part of the application for a new multi-applicant account, the first applicant device 110-1 transmits a signal 404 providing identification information of the first applicant. The signal 404 is received at the application server 200 at step 502. This identification information may contain private and/or sensitive information (e.g., the applicant's social security number (SSN), birthdate, home address, etc.). The identification information may enable the application server 200 to verify the identity of the first applicant (e.g., using the authentication server 130). In some examples, the identification information may identify the first applicant as an existing customer of the institution (e.g., the identification information may be a customer number or customer login). In such examples, the identification information may enable the application server 200 to identify and/or retrieve the corresponding customer profile (which may contain further identification information) from the customer database 144 in the business services server 140.

The first applicant device 110-1 further transmits a signal 406 providing contact information for a second applicant of the multi-applicant account. The signal 406 is received at the application server 200 at step 504. The contact information includes two or more pieces of contact data for the second applicant. For example, the contact information may include contact data enabling at least two different modes for contacting the second applicant. Modes of contact that use different communication networks may be considered different modes of contact. For example, contacting via email, text message, social media private message, physical letter, or telephone call may all be considered different modes for contacting the second applicant. The contact information may include, for example, an email address and a telephone number for the second applicant. In other examples, the contact information may enable the second applicant to be contacted using only one mode of contact, but at different contact addresses. For example, the contact information may include a home telephone number and a business telephone number for the second applicant. Other such variations may be possible.

In some examples, two or more of the signals 402-406 may be transmitted together (e.g., submitted via a single online form with multiple input fields). In other examples, the signals 402-406 may be transmitted separately, such as in response to requests (not shown) from the application server 200.

The first session conducted between the first applicant device 110-1 and the application server 200 may be ended after the application server 200 has received all the requested identification information from the first applicant (and possibly any other information needed to create the multi-applicant account profile). Alternatively, the first session may continue and other transactions may be performed.

After receiving the contact information for the second applicant, the application server 200 transmits a signal 408 providing a one-time password to the second applicant device 110-2. The signal 408 is transmitted by the application server 200 at step 506. The one-time password is transmitted using one piece of contact data (e.g., an email address) provided in the contact information.

The application server 200 also transmits a signal 410 providing a unique link to the same or different second applicant device 110-2. The signal 410 is transmitted by the application server 200 step 508. The unique link is transmitted using a different piece of contact data (e.g., a telephone number) provided in the contact information.

The signals 408 and 410 may be received at the same second applicant device 110-2, via different modes of contact. For example, the second applicant device 110-2 may be capable of multiple modes of contact (e.g., may be a smartphone capable of receiving text messages and also capable of receiving email messages). The signals 408 and 410 may also be received at different second applicant devices 110-2, each receiving the respective signal via a different mode of contact. For example, one second applicant device 110-2 (e.g., a cellular telephone) may be capable of receiving the one-time password in a text message; and another second applicant device 110-2 (e.g., a desktop computer) may be capable of receiving the unique link in an email message. Other such variations may be possible.

In some examples, one of the signals 408 and 410 may be replaced by a physical communication (e.g., a letter sent by post). For example, the application server 200 may generate a letter containing the one-time password or the unique link, and may cause the letter to be printed and mailed to a physical address (which may be included in the contact information) of the second applicant.

The one-time password and the unique link may be generated by the application server 200, and stored in a local database in association with each other. Any suitable method may be used by the application server 200 to ensure uniqueness of the one-time password and the unique link. In some examples, the one-time password and the unique link may automatically expire after a predefined period of time (e.g., 24 hours), for greater security.

The unique link may be used to access a webpage (or other user portal) to which the one-time password is inputted. The entry of the one-time password, via the unique link, may be by the same second applicant device 110-2 that received the signal 408 or 410, or may be a different second applicant device 110-2. The second applicant device 110-2 transmits a signal 412, which requests a second session between the second applicant device 110-2 and the application server 200. The signal 412 provides the one-time password together via the unique link. Typically, the second session is requested by and conducted with a single second applicant device 110-2.

The application server 200, at 413, verifies (e.g., by comparison with information stored in a local database) that the correct one-time password has been provided via the unique link. After the correct one-time password has been received via the unique link, the application server 200, at step 510, initiates the second session with the second applicant device 110-2. The use of two pieces of unique data (in this case, the one-time password and unique link), which are provided using two different pieces of contact data, to verify the second applicant may be considered a form of two-factor authentication.

The second session may be restricted to transactions related to creation of the multi-applicant account. For example, the second session may automatically cause the second applicant device 110-2 to display an online form requesting identification information from the second applicant. In other examples, the second session may enable other types of transactions and tasks to be performed. For example, the second session may, in addition to a request for identification information, also provide one or more options for performing other transactions and tasks (e.g., option to apply for a credit card, option to apply for a mortgage, etc.) that are normally provided by the application server 200.

During the second session, the second applicant device 110-2 transmits a signal 414 providing identification information about the second applicant. The signal 414 is received by the application server 200 at step 512. This identification information may contain private and/or sensitive information (e.g., the applicant's social security number (SSN), birthdate, home address, etc.). The identification information may enable the application server 200 to verify the identity of the second applicant (e.g., using the authentication server 130). In some examples, the identification information may identify the second applicant as an existing customer of the institution (e.g., the identification information may be a customer number or customer login). In such examples, the identification information may enable the application server 200 to identify and/or retrieve the corresponding customer profile (which may contain further identification information) from the customer database 144 in the business services server 140.

After the identification information from the first applicant and the identification information from the second applicant have been received, the application server 200, at step 514, verifies the identification information of all the applicants. The application server 200 may, for example, use the authentication server 130 to perform verification of the identification information. The authentication server 130 may send a signal to the application server 200 if the identification information is authentic, thus enabling the application server 200 to verify the identification information. In examples in which one or both applicants are existing customers of the institution, verification of identification information may include confirming that the applicant(s) are existing customer(s). The application server 200 may use the business services server 140 to confirm that the applicant(s) are existing customer(s) (e.g., by determining whether the provided identification information matches an existing customer profile stored in the customer database 144), and the application server 200 may retrieve further identification information from the customer database 144 of the business services server 140.

If verification of identification information for one or both applicants fails, the application server 200 may generate a notification to the respective applicant(s) indicating that verification failed. The notification may provide an opportunity to re-enter identification information. After verification fails for a predefined number of times (e.g., five times), the application server 200 may generate a notification to all applicants indicating that the request to create a new multi-applicant account has been refused.

After the identification information has been verified, the application server 200, at step 516, creates a new multi-applicant account profile. The application server 200 may also instruct the business services server 140 to create a new customer profile for any applicant that is not an existing customer. The newly created multi-applicant account profile is linked to the customer profiles of the first and second applicants.

For simplicity, steps 514 and 516 are represented by a single block 416.

Optionally, at step 518, the application server 200 may transmit signals 418 to one or both applicants to notify that the multi-applicant account was successfully created. The notification may include information about the account, such as the account number.

The signals and steps illustrated in the drawings are shown in an example order, which is not intended to be limiting. It should be understood that the order of the signals and steps may be varied. For example, the identification information of the first applicant may be provided at any time during the first session, and may be provided later than the identification information of the second applicant, for example. In other words, the initiation of the second session and completion of identification information for the second applicant is not necessarily reliant on completion of identification information for the first applicant. In this way, the second applicant does not need to wait on the first applicant.

It should be noted that the first and second sessions may overlap in time. For example, the second applicant may providing identification information during the second session at the same time that the first applicant is still providing identification information during the first session.

It should also be noted that the first session and the second session may be independent from each other. The first applicant may not have any knowledge of any information exchanged in the second session; and the second applicant may not have any knowledge of any information exchanged in the first session. The first applicant may not be able to navigate to the webpage being used by the second applicant, and vice versa. The identification information provided in one session may be inaccessible via another session. Thus, the privacy of each applicant may be maintained.

FIGS. 4 and 5 show creation of a multi-applicant account having two applicants. It should be understood that similar methods may be used for creation of a multi-applicant account having three or more applicants. For example, during the first session, contact information one or more additional applicants may be provided. At least two different pieces of contact data are provided for each additional applicant. After the first applicant provides contact information for each additional applicant, a unique pair of one-time password and unique link is generated and provided to each additional applicant. Each applicant then may request a respective session with the application server, using the respective pair of one-time password and unique link. Each session conducted with each applicant may be independent from each other session, to help maintain privacy between applicants. Any of the sessions may be conducted in any appropriate temporal order.

FIGS. 6A-6E illustrate some example user interfaces that may be displayed during the method 400. There may be other user interfaces, in addition to or instead of those shown, that may be provided during the method 400. The application server 200 may provide signals to a client device (e.g., first or second applicant device 110-1, 110-2) to display one or more of the example user interfaces illustrated in FIGS. 6A-6E.

In some examples, one or more user interfaces may provide an online form, with appropriate input fields, to enable an applicant to provide the required information (and possibly also optional information) to create the requested multi-applicant account profile. Where appropriate, the example user interfaces may also enable an applicant to provide the required information (and possibly also optional information) to create a new customer profile for that applicant. The example user interfaces may be designed to be similar to an online form for creating a single applicant account profile, to user convenience.

In examples where an applicant has been identified as an existing customer of the institution (e.g., the applicant has provided a login name and a valid password corresponding to an existing customer profile), one or more fields of the online form may be automatically filled in by the application server 200, using information retrieved from the customer profile.

In other examples, an applicant may interact with the application server 200 in other ways, for example via text messaging (e.g., using a chatbot), instead of using an online form to provide the required information (and possibly also optional information).

FIGS. 6A-6E are now described in detail, with references made to FIG. 4 where applicable.

FIG. 6A shows an example user interface 610 that may be used to enable the first applicant, during the first session, to provide contact information for the second applicant. The application server 200 may transmit signals to the first applicant device 110-1 to cause the user interface 610 to be displayed on the first applicant device 110-1. In this example, the user interface 610 provides a field 612 to input the name of the second applicant. The user interface 610 also enables input of two pieces of contact data for the second applicant. In this example, a drop-down menu 614a and input field 614b enables input of a first piece of contact data, and another drop-down menu 616a and another input field 616b enables input of a second piece of contact data. Each drop-down menu 614a, 616a may provide options for selecting a mode of contact (e.g., email, phone, text, etc.). In some examples, after one mode of contact has been selected in one of the drop-down menus 614a, 616a, that mode of contact may be grayed-out or otherwise unavailable to be selected in the other drop-down menu 616a, 614a; this may be to ensure that the two pieces of contact data provided for the second applicant are for two different modes of contact.

The user interface 610 also provides a selectable option 618 to add a third (or more) applicant. If the option 618 is selected, the user interface 610 may be expanded to display additional input fields for inputting name and contact information for the third (or more) applicant. Selection of a submit button 619 results in the contact information of the second applicant being transmitted to the application server 200 (e.g., signal 406 in FIG. 4).

The application server 200 may use the contact information of the second applicant to communicate with the second applicant device(s) 110-2, to cause the example user interfaces 620 an 630 (FIGS. 6B and 6C) to be displayed on the respective second applicant device(s) 110-2.

For example, the signal 408 may cause the example user interface 620 to be displayed (e.g., in a text message) on a text message-capable second applicant device 110-2, to provide the unique one-time password 622. The signal 410 may cause the example user interface 630 to be displayed (e.g., in an email) on an email-capable second applicant device 110-2, to provide the unique link 632.

Figure 6B:
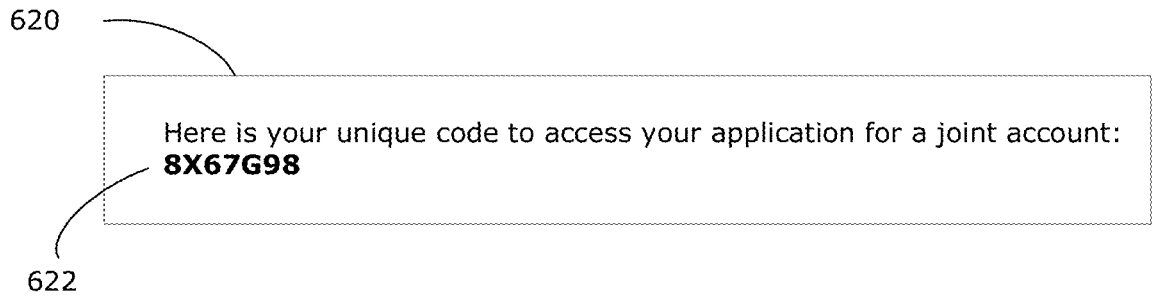
Figure 6C:
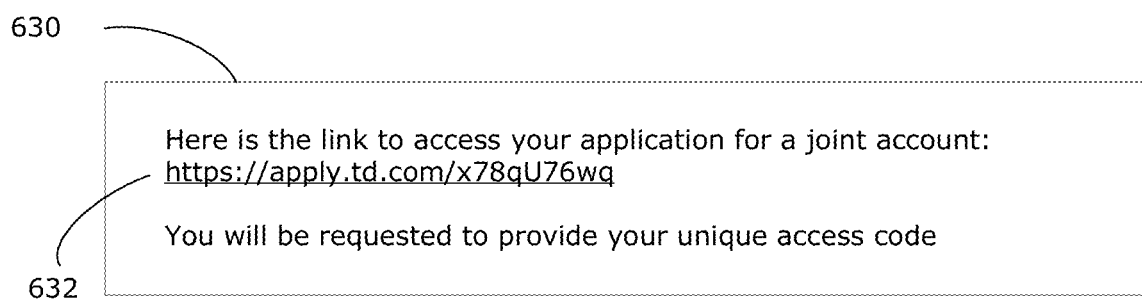
Figure 6D:
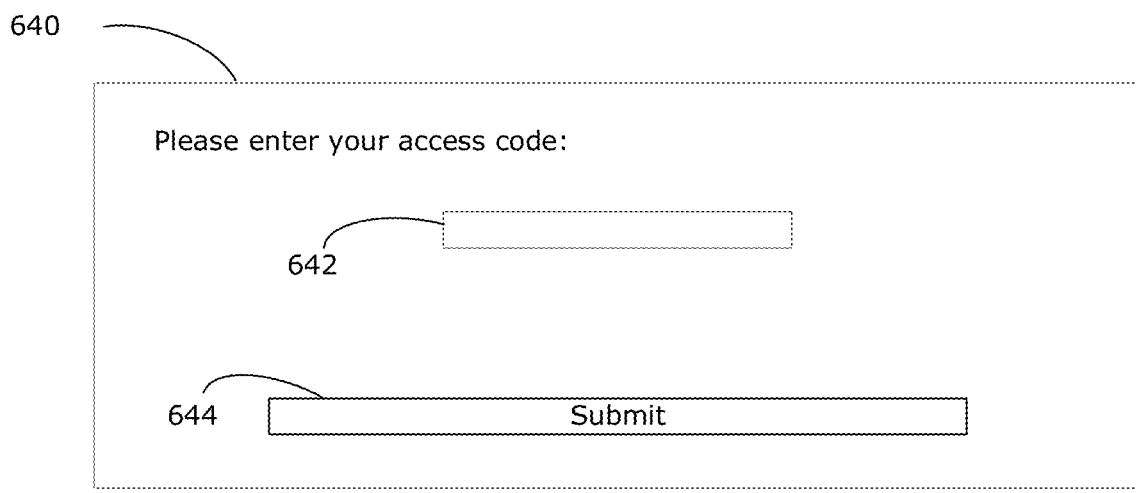

After the second applicant accesses the unique link (e.g., by clicking on the link 632 in the user interface 630), the second applicant device 110-2 may navigate to the webpage referenced by the unique link, and the user interface 640 of FIG. 6D may be presented. The example user interface 640 provides an input field 642 to input the one-time password 622. Selection of the submit button 644 results in the one-time password, inputted via the unique link, to be transmitted to the application server 200 (e.g., signal 412 in FIG. 4).

FIG. 6E shows an example user interface 650 that may be used to enable the second applicant, during the second session, to provide identification information. The application server 200 may transmit signals to the second applicant device 110-2 to cause the user interface 650 to be displayed on the second applicant device 110-2. In this example, the user interface 650 provides fields 652, 654, 656 to input the full legal name, birthdate and home address, respectively, of the second applicant. Selection of a submit button 658 results in the identification information of the second applicant being transmitted to the application server 200 (e.g., signal 414 in FIG. 4).

In some examples, the user interface presented for the second applicant to input identification information may be similar to a user interface that is presented for the first applicant to input identification information. However, in some examples, the first applicant may be provided with additional options (e.g., option to add a third or more applicant, or option to select the type of joint account) not available to the second applicant.

In some examples, the second applicant may be enabled to add a third applicant. Such an example is described below.

Figure 7:
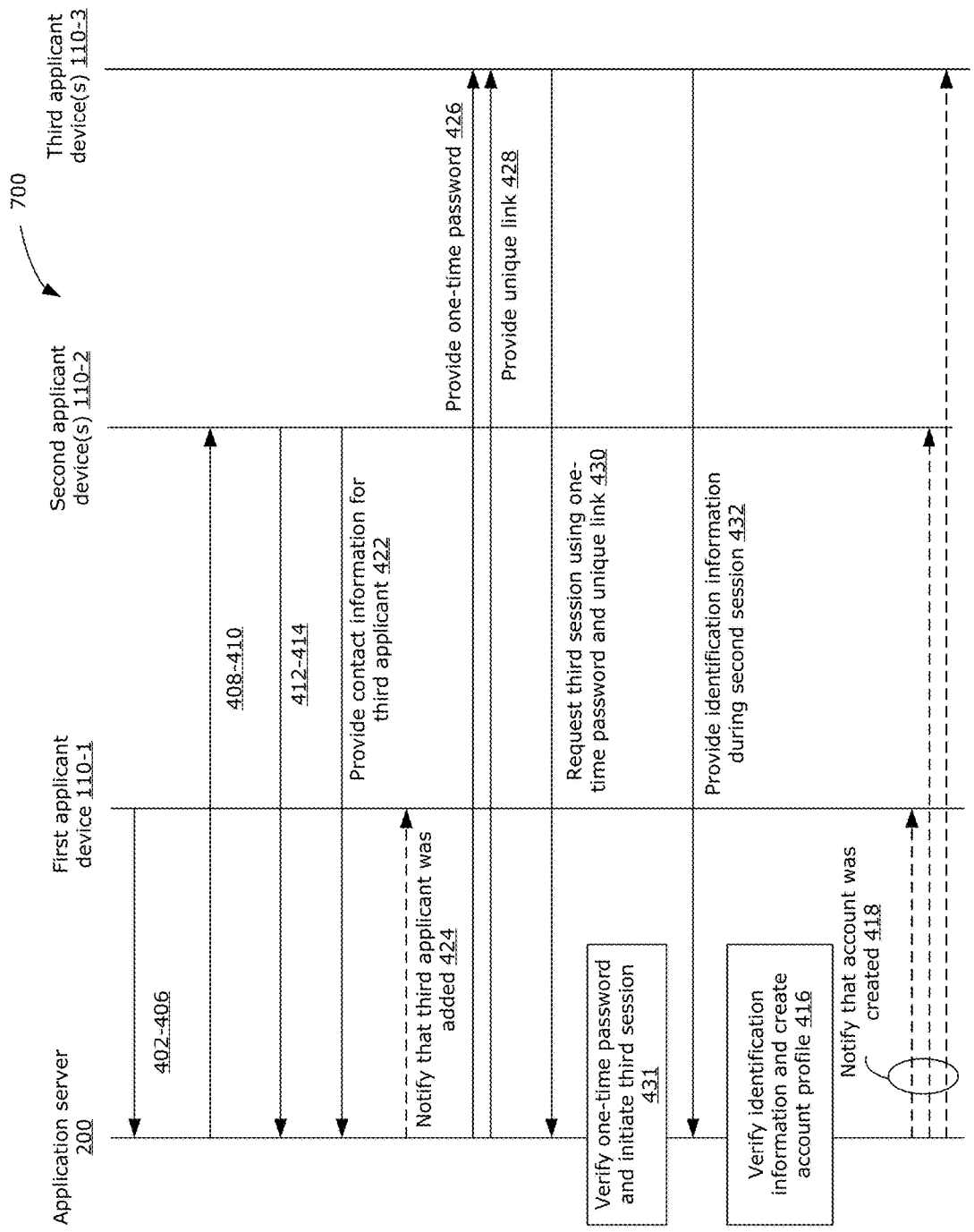
FIG. 7 is a signaling diagram illustrating another example method for creating a multi-applicant account profile.
Figure 8:
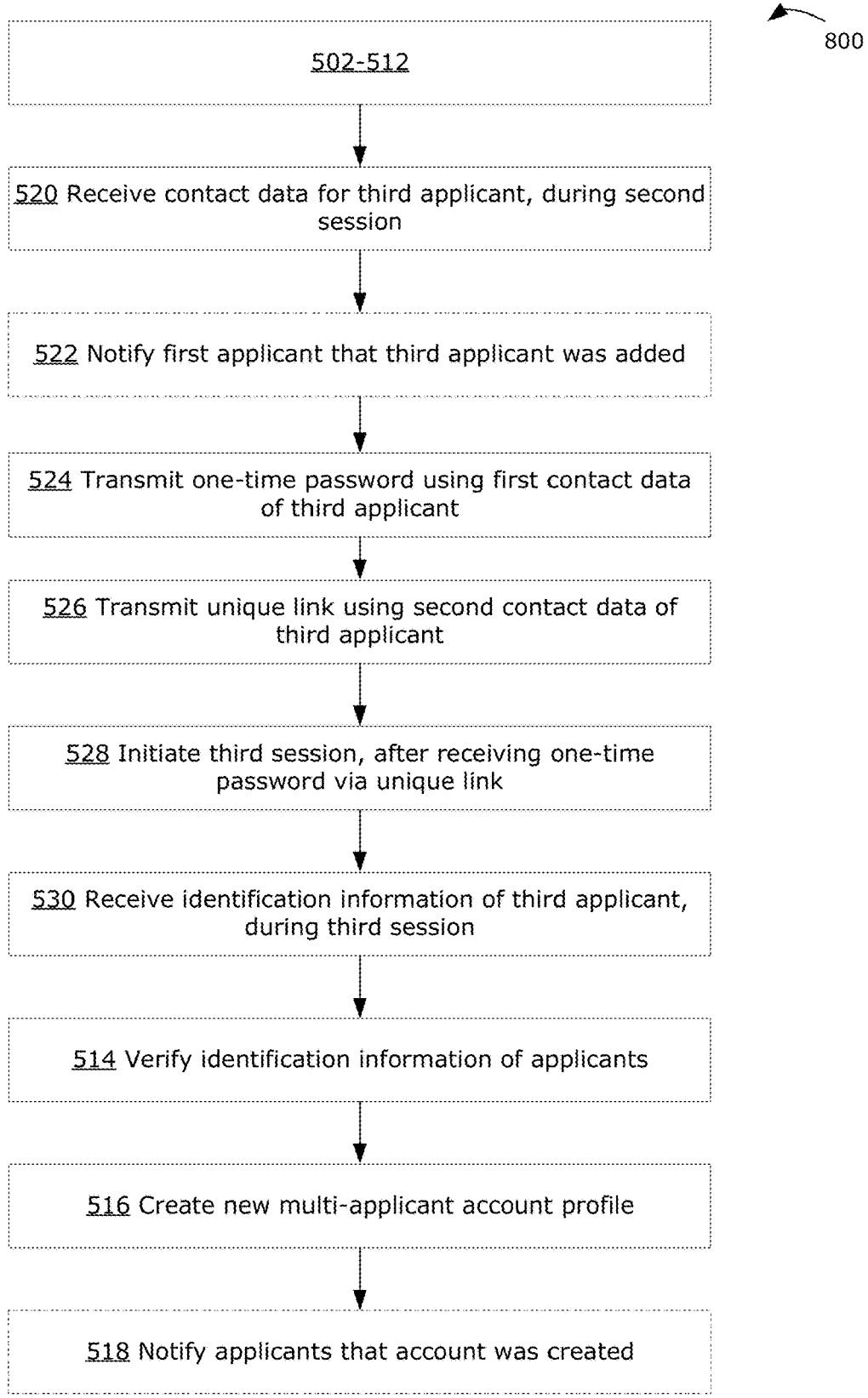
FIG. 8 is a flowchart illustrating an example method performed by the application server, as part of the method of FIG. 7.

FIGS. 7 and 8 are now described together. FIG. 7 illustrates an example signaling diagram of another example method 700 for creating a new multi-applicant account profile. FIG. 8 is a flowchart illustrating a method 800, which may be performed by the application server 200 as part of the method 700. Although FIG. 7 shows signals being transmitted directly between the entities illustrated, it should be understood that there may be one or more intermediate nodes (e.g., intermediate access points and/or relay nodes) not shown for simplicity. Further, although FIG. 7 and FIG. 8 illustrate an order to the signals and steps of the method 700, it should be understood that this is only for the purpose of illustration; the method 700 may be performed in an order different from that specifically shown.

The method 700 may be similar to the method 400 in some ways. Where appropriate, the same reference numerals have been used to indicate similar signals or steps. The method 700 enables creation of a new multi-applicant account profile, and enables the second applicant to further add a third applicant. In this example, each additional applicant may further invite another applicant. Thus, in this example, the ability to add applicants to the multi-applicant account is not limited to the first applicant.

Similar to the method 400, the method 700 includes signals 402-406 transmitted from the first applicant device 110-1 to the application server 200, signals 408-410 transmitted from the application server 200 to the second applicant device(s) 110-2, and signals 412-414 transmitted from the second applicant device 110-2 to the application server 200. From the application server 200 viewpoint, steps 510-512 are similar to those described above for the method 400.

During the second session conducted between the second applicant device 110-2, the second applicant device 110-2 transmits a signal 422 providing contact information for a third applicant. At the application server 200, the signal 422 is received at step 520. Similarly to the contact information provided for the second applicant, the contact information for the third applicant includes two or more pieces of contact data for the third applicant. For example, the contact information may include contact data enabling at least two different modes for contacting the third applicant. In other examples, the contact information may enable the third applicant to be contacted using only one mode of contact, but at different contact addresses. Other such variations may be possible.

In some examples, the signals 414 and 422 may be transmitted together (e.g., submitted via a single online form with multiple input fields). In other examples, the signals 414 and 422 may be transmitted separately, such as in response to requests (not shown) from the application server 200.

Optionally, the application server 200 may, at step 522, transmit a signal 424 to notify the first applicant device 110-1 that the third applicant was added by the second applicant. The notification may ask the first applicant to confirm or approve the addition of the third applicant. If the first applicant does not confirm or approve the addition of the third applicant, the addition of the third applicant may be refused by the application server 200.

After the contact information for this third applicant has been received (and after receipt of confirmation or approval from the first applicant, if requested), the application server 200 transmits a signal 426 providing a one-time password to the third applicant device 110-3. The signal 426 is transmitted by the application server 200 at step 524. The one-time password is transmitted using one piece of contact data (e.g., an email address) provided in the contact information.

The application server 200 also transmits a signal 428 providing a unique link to the same or different third applicant device 110-3. The signal 428 is transmitted by the application server 200 step 526. The unique link is transmitted using a different piece of contact data (e.g., a telephone number) provided in the contact information.

The signals 426 and 428 may be received at the same third applicant device 110-3, via different modes of contact. The signals 426 and 428 may also be received at different third applicant devices 110-3, each receiving the respective signal via a different mode of contact.

In some examples, one of the signals 426 and 428 may be replaced by a physical communication (e.g., a letter sent by post). For example, the application server 200 may generate a letter containing the one-time password or the unique link, and may cause the letter to be printed and mailed to a physical address (which may be included in the contact information) of the third applicant.

The unique link may be used to access a webpage to which the one-time password is inputted. The entry of the one-time password, via the unique link, may be by the same third applicant device 110-3 that received the signal 426 or 428, or may be a different third applicant device 110-3. The third applicant device 110-3 transmits a signal 430, which requests a third session between the third applicant device 110-3 and the application server 200. The signal 430 provides the one-time password together via the unique link. Typically, the third session is requested by and conducted with a single third applicant device 110-3.

The application server 200, at 431, verifies (e.g., by comparison with information stored in a local database) that the correct one-time password has been provided via the unique link. After the correct one-time password has been received via the unique link, the application server 200, at step 528, initiates the third session with the third applicant device 110-3.

The third session may be restricted to transactions related to creation of the multi-applicant account. In other examples, the third session may enable other types of transactions and tasks to be performed.

During the third session, the third applicant device 110-3 transmits a signal 432 providing identification information about the third applicant. The signal 432 is received by the application server 200 at step 530. This identification information may contain private and/or sensitive information (e.g., the applicant's social security number (SSN), birthdate, home address, etc.). The identification information may enable the application server 200 to verify the identity of the third applicant (e.g., using the authentication server 130). In some examples, the identification information may identify the third applicant as an existing customer of the institution (e.g., the identification information may be a customer number or customer login). In such examples, the identification information may enable the application server 200 to identify and/or retrieve the corresponding customer profile (which may contain further identification information) from the customer database 144 in the business services server 140.

The method 700 then proceeds with verification of identification information and creation of the multi-applicant account profile (and optionally notifying applicants that account was successfully created), similar to that described above with reference to FIGS. 4 and 5.

Figure 9A:
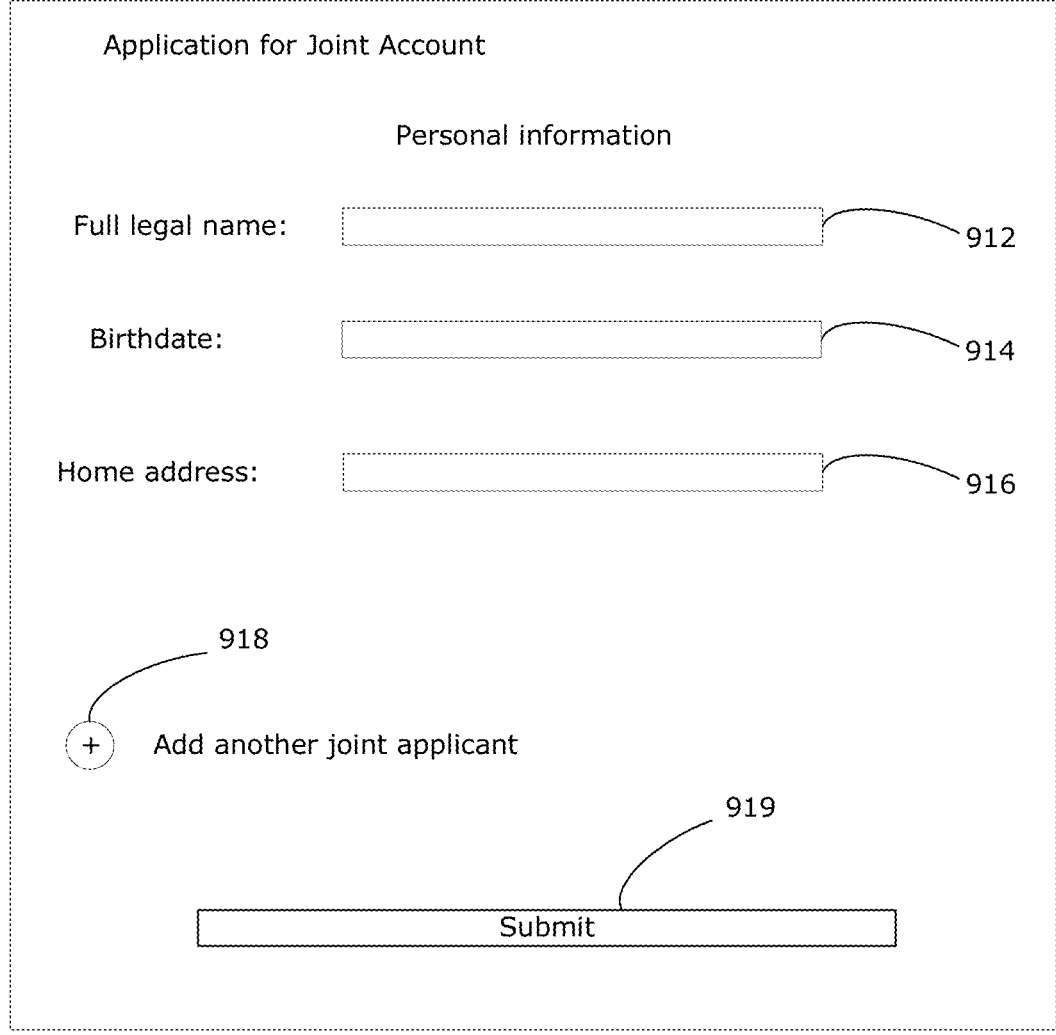
FIGS. 9A-9C show example user interfaces that may be displayed during the method of FIG. 7.
Figure 9B:
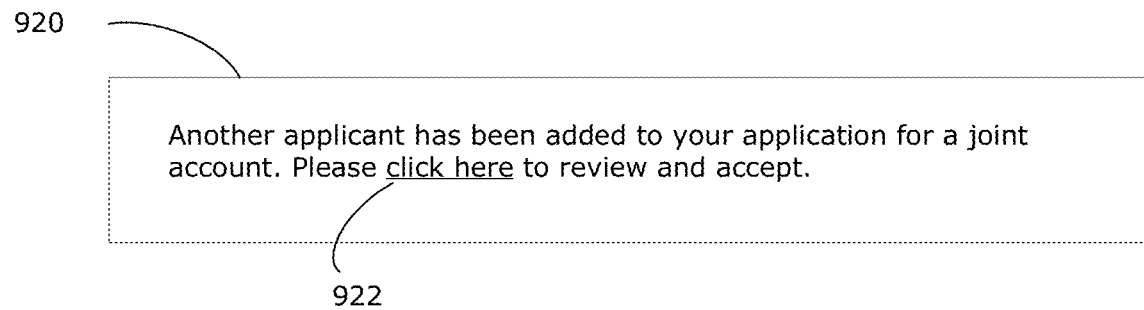
Figure 9C:
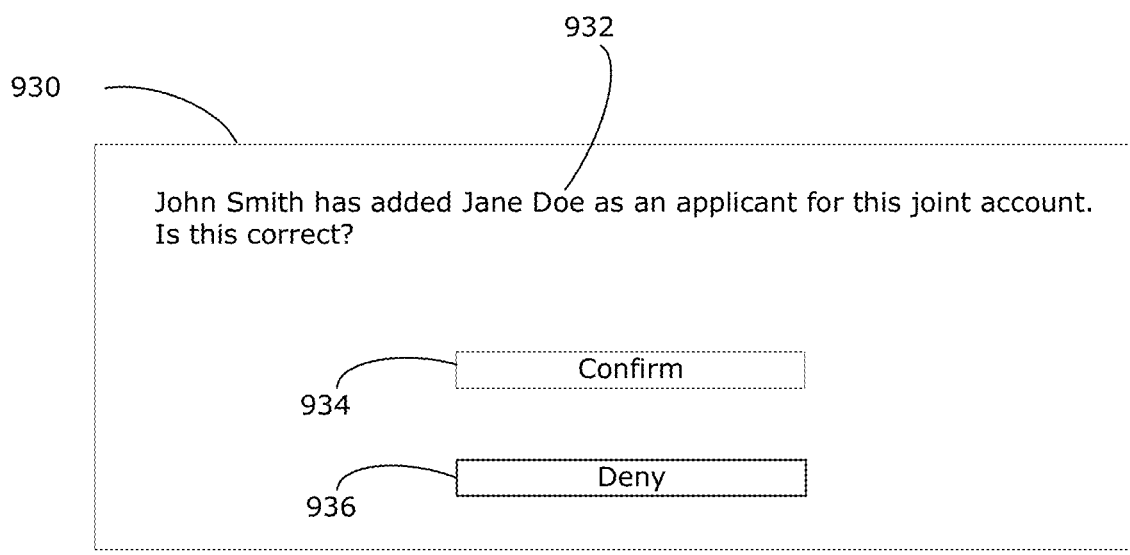

FIGS. 9A-9C illustrate some example user interfaces that may be displayed during the method 700. There may be other user interfaces, in addition to or instead of those shown, that may be provided during the method 700. The application server 200 may provide signals to a client device (e.g., first or second applicant device 110-1, 110-2) to display one or more of the example user interfaces illustrated in FIGS. 9A-9C. One or more of the user interfaces discussed above with respect to FIGS. 6A-6D may be used together with the user interfaces illustrated in FIGS. 9A-9C. The use of the previously-described user interfaces of FIGS. 6A-6D will not be discussed in detail in the context of the method 700.

FIGS. 9A-9C are now described in detail, with references made to FIG. 7 where applicable.

FIG. 9A shows an example user interface 910 that may be used to enable the second applicant, during the second session, to provide identification information. The user interface 910 may be used instead of the previously-described user interface 650 of FIG. 6E. The application server 200 may transmit signals to the second applicant device 110-2 to cause the user interface 910 to be displayed on the second applicant device 110-2. In this example, the user interface 910 provides fields 912, 914, 916 to input the full legal name, birthdate and home address, respectively, of the second applicant, similarly to the user interface 650 of FIG. 6E.

In addition, the user interface 910 also provides a selectable option 918 to add a third (or more) applicant. If the option 918 is selected, the user interface 910 may be expanded to display additional input fields (e.g., similar to the input fields discussed above with respect to the user interface 610 of FIG. 6A) for inputting name and contact information for the third (or more) applicant. In some examples, instead of expanding the user interface 910 to display input fields for inputting contact information for the third (or more) applicant, a separate user interface (not shown) may be displayed. Selection of a submit button 919 results in the identification information of the second applicant, as well as the contact information of the third (or more) applicant, being transmitted to the application server 200 (e.g., signals 414 and 422 in FIG. 4).

Optionally, the application server 200 may transmit the signal 424 to notify the first applicant that the third (or more) applicant was added by the second applicant. FIG. 9B shows an example user interface 920 that may be caused to be displayed on the first applicant device 110-1, to provide this notification. The user interface 920 in this example includes a link 922 that may be selected by the first applicant in order to confirm or approve the addition of the third (or more applicant) by the second applicant. In other examples, the user interface 920 may not include the link 922 and may only serve to notify the first applicant, without providing any option to confirm or approve the addition of the third (or more) applicant.

In this example, selection of the link 922 may cause the first applicant device 110-1 to navigate to a webpage where the user interface 930 of FIG. 9C may be presented. The user interface 930 may provide information 932 identifying the third (or more) applicant that was added (e.g., providing the name of the third (or more) applicant) and possibly also identifying the second applicant who added the third (or more applicant). The example user interface 930 may include a selectable option 934 to confirm or approve the addition of the third (or more) applicant for the multi-applicant account, and may also include a selectable option 936 to deny or refuse the addition of the third (or more) applicant.

If the third (or more) applicant is confirmed or approved by the first applicant, the application server 200 may use the contact information of the third applicant to communicate with the third applicant device(s) 110-3, to provide the one-time password and unique link to the third applicant, as discussed previously.

In some examples, the present disclosure enables creation of multi-applicant account profiles remotely (e.g., via online sessions) by the applicants. Multiple sessions, each conducted by a respective different applicant, may be conducted in order for the required information (e.g., identification information from each applicant) to be received. Each session may be independent of each other session, accessed using a unique pair of one-time password and unique link. From the viewpoint of each applicant, their portion of the application is complete after submission of the required information (e.g., their own identification information) has been completed during their own session. The information gathered from the separate sessions is separately collected and collated by the application server to complete a single application for the multi-applicant account. The use of multiple sessions may provide greater flexibility and convenience, because each applicant may conduct their own session at their own time and location.

In some examples, each applicant's session may be private from each other applicant. The information provided by an applicant during their session may be inaccessible to each other applicant (and inaccessible to even the first applicant who initiated the application for the multi-applicant account). This may help to ensure privacy of each applicant, by shielding private identification information from other applicants.

In some examples, the present disclosure may be used for opening business accounts, such as for multi-owner businesses or partnerships.

Although the present disclosure is described, at least in part, in terms of methods, a person of ordinary skill in the art will understand that the present disclosure is also directed to the various components for performing at least some of the aspects and features of the described methods, be it by way of hardware (digital signal processors (DSPs), application specific integrated circuits (ASICs), or field-programmable gate arrays (FPGAs)), software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device (e.g., a data manager) to execute examples of the methods disclosed herein.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are examples only and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of profiles, records or data that is stored in a computer system. The above examples are example only, and thus are not intended to limit in any way the definition and/or meaning of the terms "processor" or "database".

The present disclosure includes figures showing designs having boundary lines illustrated as solid lines. The present disclosure is not limited to design drawings that strictly include all solid boundary lines. Designs disclosed herein include design drawings in which one or more boundary lines shown as solid lines may be disclaimed from the drawing. Boundary lines that are depicted in the presently disclosed drawings as solid lines may be replaced with broken boundary lines, and vice versa.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A server comprising:
   at least one communication interface for communication with one or more client devices;
      a processor coupled to the communication interface; and
      a memory coupled to the processor, the memory having computer-executable instructions stored thereon, the instructions, when executed by the processor, cause the server to:
      during a first remote session, receive, via the communication interface, a signal representing a request to apply for a new multi-applicant account, a signal representing identification information for verifying an identity of a first applicant, and a signal representing at least two pieces of contact data for a second applicant provided by the first applicant;
      in response to receiving the signal representing the at least two pieces of contact data for the second applicant:
         transmit, using a first piece of contact data from the at least two pieces of contact data for the second applicant, via the communication interface, a signal representing a unique link; and
         transmit, using a second piece of contact data from the at least two pieces of contact data for the second applicant, via the communication interface, a signal representing a one-time password;
      initiate a second remote session, in response to receipt, via the communication interface, of the signal representing the one-time password, the one-time password being provided via the unique link;
      during the second remote session, receive, via the communication interface, a signal representing identification information for verifying an identity of the second applicant; and
      create a new multi-applicant account profile, after verifying the identity of the first applicant and the identity of the second applicant using the identification information of the first applicant and the identification information of the second applicant respectively.

2. The server of claim 1, wherein the instructions, when executed by the processor, further cause the server to:
   during the first remote session, receive, via the communication interface, a signal representing at least two pieces of contact data for a third applicant;
   transmit, using a first piece of contact data for the third applicant, via the communication interface, a signal representing another unique link;
   transmit, using a second piece of contact data for the third applicant, via the communication interface, a signal representing another one-time password;
   initiate a third remote session, in response to receipt, via the communication interface, of a signal representing the other one-time password, the other one-time password being provided via the other unique link; and
   during the third remote session, receive, via the communication interface, a signal representing identification information for verifying an identity of the third applicant;
   wherein the new multi-applicant account profile is created after verifying the identity of the first applicant, the identity of the second applicant and the identity of the third applicant using the identification information of the first applicant, the identification information of the second applicant, and the identification information of the third applicant respectively.

3. The server of claim 2, wherein the second remote session and the third remote session can be conducted in parallel, or in any temporal order.

4. The server of claim 1, wherein the instructions, when executed by the processor, further cause the server to:
during the second remote session, receive, via the communication interface, a signal representing at least two pieces of contact data for a third applicant;
transmit, using a first piece of contact data for the third applicant, via the communication interface, a signal representing another unique link;
transmit, using a second piece of contact data for the third applicant, via the communication interface, a signal representing another one-time password;
initiate a third remote session, in response to receipt, via the communication interface, of a signal representing the other one-time password, the other one-time password being provided via the other unique link; and
during the third remote session, receive, via the communication interface, a signal representing identification information of the third applicant;
wherein the new multi-applicant account profile is created after verifying the identity of the first applicant, the identity of the second applicant and the identity of the third applicant using the identification information of the first applicant, the identification information of the second applicant, and the identification information of the third applicant respectively.

5. The server of claim 4, wherein the instructions, when executed by the processor, further cause the server to:
transmit, via the communication interface, signals representing a notification to the first applicant indicating addition of the third applicant;
wherein the new multi-applicant account profile is created after receiving, via the communication interface, signals representing confirmation of the third applicant by the first applicant.

6. The server of claim 1, wherein the at least two pieces of contact data for the second applicant include at least two of:
an email address;
a phone number; or
a social media account.

7. The server of claim 6, wherein the signal representing the unique link is transmitted using one of:
an email message to the email address;
a text message to the phone number; or
a private message to the social media account;
and wherein the signal representing the one-time password is transmitted using a different one of:
an email message to the email address;
a text message to the phone number; or
a private message to the social media account.

8. The server of claim 1, wherein the instructions, when executed by the processor, further cause the server to:
receive the identification information from one of the first applicant or the second applicant by:
verifying that the one of the first applicant or the second applicant is an existing customer; and
retrieving the identification information of the one of the first applicant or the second applicant from a customer database.

9. The server of claim 1, wherein the instructions, when executed by the processor, further cause the server to:
after creating the multi-applicant account, transmit, via the communication interface, signals representing a respective notification to each applicant to indicate the multi-applicant account was successfully created.

10. The server of claim 1, wherein the identification information of the second applicant is inaccessible to the first applicant, and the identification information of the first applicant is inaccessible to the second applicant.

11. A method at a server, the method comprising:
during a first remote session, receiving a signal representing a request to apply for a new multi-applicant account, a signal representing identification information for verifying an identity of a first applicant, and a signal representing at least two pieces of contact data for a second applicant provided by the first application;
in response to receiving the signal representing the at least two pieces of contact data for the second applicant:
transmitting, using a first piece of contact data from the at least two pieces of contact data for the second applicant a signal representing a unique link; and
transmitting, using a second piece of contact data from the at least two pieces of contact data for the second applicant, a signal representing a one-time password;
initiating a second remote session, in response to receipt of the signal representing the one-time password, the one-time password being provided via the unique link;
during the second remote session, receiving a signal representing identification information for verifying an identity of the second applicant; and
creating a new multi-applicant account profile, after verifying the identity of the first applicant and the identity of the second applicant using the identification information of the first applicant and the identification information of the second applicant respectively.

12. The method of claim 11, further comprising:
during the first remote session, receiving a signal representing at least two pieces of contact data for a third applicant;
transmitting, using a first piece of contact data for the third applicant a signal representing another unique link;
transmitting, using a second piece of contact data for the third applicant a signal representing another one-time password;
initiating a third remote session, in response to receipt of a signal representing the other one-time password, the other one-time password being provided via the other unique link; and
during the third remote session, receiving a signal representing identification information for verifying an identity of the third applicant;
wherein the new multi-applicant account profile is created after verifying the identity of the first applicant, the identity of the second applicant and the identity of the third applicant using the identification information of the first applicant, the identification information of the second applicant, and the identification information of the third applicant respectively.

13. The method of claim 12, wherein the second remote session and the third remote session can be conducted in parallel, or in any temporal order.

14. The method of claim 11, further comprising:
during the second remote session, receiving a signal representing at least two pieces of contact data for a third applicant;

transmitting, using a first piece of contact data for the third applicant a signal representing another unique link;
transmitting, using a second piece of contact data for the third applicant a signal representing another one-time password;
initiating a third remote session, in response to receipt of a signal representing the other one-time password, the other one-time password being provided via the other unique link; and
during the third remote session, receiving a signal representing identification information of the third applicant;
wherein the new multi-applicant account profile is created after verifying the identity of the first applicant, the identity of the second applicant and the identity of the third applicant using the identification information of the first applicant, the identification information of the second applicant, and the identification information of the third applicant respectively.

15. The method of claim 14, further comprising:
transmitting signals representing a notification to the first applicant indicating addition of the third applicant;
wherein the new multi-applicant account profile is created after receiving signals representing confirmation of the third applicant by the first applicant.

16. The method of claim 11, wherein the at least two pieces of contact data for the second applicant include at least two of:
an email address;
a phone number; or
a social media account;
wherein the signal representing the unique link is transmitted using one of:
an email message to the email address;
a text message to the phone number; or
a private message to the social media account;
and wherein the signal representing the one-time password is transmitted using a different one of:
an email message to the email address;
a text message to the phone number; or
a private message to the social media account.

17. The method of claim 11, wherein receiving the identification information from one of the first applicant or the second applicant comprises:
verifying that the one of the first applicant or the second applicant is an existing customer; and
retrieving the identification information of the one of the first applicant or the second applicant from a customer database.

18. The method of claim 11, wherein the identification information of the second applicant is inaccessible to the first applicant, and the identification information of the first applicant is inaccessible to the second applicant.

19. A non-transitory machine-readable medium having tangibly stored thereon executable instructions for execution by a processor of a server, wherein the instructions, when executed by the processor, cause the server to:
during a first remote session, receive, via a communication interface of the server, a signal representing a request to apply for a new multi-applicant account, a signal representing identification information for verifying an identity of a first applicant, and a signal representing at least two pieces of contact data for a second applicant from the first application;
in response to receiving the signal representing the at least two pieces of contact data for the second applicant:
transmit, using a first piece of contact data from the at least two pieces of contact data for the second applicant, via the communication interface, a signal representing a unique link; and
transmit, using a second piece of contact data from the at least two pieces of contact data for the second applicant, via the communication interface, a signal representing a one-time password;
initiate a second remote session, in response to receipt, via the communication interface, of the signal representing the one-time password, the one-time password being provided via the unique link;
during the second remote session, receive, via the communication interface, a signal representing identification information for verifying an identity of the second applicant; and
create a new multi-applicant account profile, after verifying the identity of the first applicant and the identity of the second applicant using the identification information of the first applicant and the identification information of the second applicant respectively.

20. The server of claim 1, wherein the instructions, when executed by the processor, further cause the server to:
during the first remote session, receive the signal representing the at least two pieces of contact data for the second applicant provided by the first applicant, the at least two pieces of contact data enabling at least two different modes of contacting the second applicant; and
in response to receiving the signal representing the at least two pieces of contact data for the second applicant:
transmit, using the first piece of the contact data via a first mode of contact, the signal representing the unique link; and
transmit, using the second piece of the contact data via a second mode of contact, the signal representing the one-time password.

* * * * *